3,261,699
METHOD OF PREPARING ALUMINA REFRACTORY
Jack L. Henry, Albany, Oreg., assignor to Kaiser Aluminum & Chemical Corporation, Oakland, Calif., a corporation of Delaware
No Drawing. Filed Apr. 8, 1963, Ser. No. 271,510
4 Claims. (Cl. 106—62)

This invention relates to refractory materials and methods of producing same. More particularly, the invention relates to refractory materials comprising mixtures of alumina ($Al_2O_3$) and at least one fluoride from the group consisting of alkali metal fluorides, alkaline earth metal fluorides, aluminum fluoride and mixtures thereof.

The refractory material according to the invention is particularly suited for use as a lining material for furnaces and electrolytic cells and, in particular, electrolytic cells used for the preparation or production of aluminum, e.g., refining and reduction cells. One reasons, in addition to the properties of the refractory material, that this refractory is particularly suited for such use is that the constituents of the refractory are in general compatible with the materials normally employed in such cells. The refractory composition, according to the invention, is uniquely suited for use in electrolytic cells for the production and preparation of aluminum because it is largely composed of materials which are added to the electrolytic cell during operation thereof.

The refractory material is prepared according to the invention by blending $Al_2O_3$ in powdered form with at least one fluoride from the group consisting of alkali metal fluorides, alkaline earth metal fluorides and aluminum fluorides in the desired proportions, preferably by mixing in a ball mill. The mixture is then precalcined, pressed into form and thereafter fired at an elevated temperature, e.g., at least about 850° C., preferably about 1000° C. The precalcined mixture can be milled again prior to pressing and firing. The alumina used can be Bayer process alumina and the cryolite can be artificial cryolite. The alumina content preferably comprises the major proportion of the mixture, i.e., 50% or greater, and the fluoride component, the minor proportion, i.e., less than 50%. Refractory bodies of satisfactory strength and density have been produced wtih 10% cryolite or less. Small amounts of additives such as metallic oxides, aluminates, etc., can be used to promote bonding, etc. The resulting refractory body can thereafter be used to line the sides and/or bottom of furnaces or cells.

The following examples illustrate the effect of various factors on the properties of the refractory body produced.

The effect of blending and mixing the refractory mixture by milling was determined by producing bodies containing 10% cryolite, the balance substantially alumina, and milling for 4, 8 and 12 hours prior to firing. The results indicate that the ball milling considerably increases the density of the refractory body. An increase in density of as much as 20–30% results from ball milling. There appears to be little difference in the result of ball milling for extended times over that of ball milling for a short period. The milling of the refractory mixture increases the density of both the green and the firing body.

The additional increase in density and crushing strength obtained by precalcining the refractory blend of alumina and cryolite is shown by the following examples:

Groups of bricks were made of unmilled and milled mixtures of alumina and fluoride. The firing technique employed in both groups was identical: 100° C. per hour up to 300° C., and then 200° C. per hour from 300° to 1200° C. The bricks were held at 1200° C. for three hours and then furnace-cooled. These bricks were crushed and reprocessed to simulate bricks of precalcined material. No additional fluoride was added to these bricks. The bricks were again cut in half and fired. Both the green density and the final density were greatly increased and the bricks were harder than the comparable brick which was produced from the uncalcined alumina. Additional bricks were produced of unmilled precalcined mix. These bricks were fired according to the same schedule. The following Table I discloses the results of these tests:

TABLE I

|  | Uncalcined Unmilled | | Uncalcined Milled | | Calcined Unmilled | | Calcined Milled | |
|---|---|---|---|---|---|---|---|---|
|  | A | B | A | B | A | B | A | B |
| Green Density | 1.24 | 1.23 | 1.60 | 1.60 | 2.08 | 2.09 | 2.20 | 2.20 |
| Fired Density | 1.17 | 1.22 | 1.84 | 1.91 | 1.98 | 1.86 | 2.14 | 2.02 |
| Percent Vol. Shrinkage | .01 | 5.1 | 18.4 | 20.1 | [1]1.4 | [1]9.2 | 0.8 | [1]5.3 |
| Percent Wt. Loss | 6.2 | 4.7 | 6.2 | 4.4 | 3.7 | 2.7 | 3.2 | 2.7 |

[1] Expansion.
A. Fired in open silicon carbide muffle.
B. Packed in crushed graphite and fired in closed graphite muffle.

As can be seen, both the green and fired density increase upon milling and increase further upon calcining. Thus, the calcined, unmilled refractory possesses a greater density than the uncalcined, unmilled mixture, and the calcined, milled refractory brick has a higher density than the uncalcined, milled brick. The greatest density is achieved when the refractory mixture is both calcined and milled. The calcining referred to is "precalcining" as distinguished from subsequent or final firing of the refractory body.

It is advantageous in performing the invention to minimize or avoid volatilization of any of components of the refractory mixture. Volatilization results in larger weight loss and as shown in Table I the higher densities unexpectedly are obtained when the percent weight loss is less. Thus, firing advantageously is performed at a temperature below the volatilization of the fluoride constituent, that is, at a temperature below that at which substantial volatilization will occur.

It has been found that much higher green densities can be realized if the precalcination is conducted with the addition of fluoride to the mix. Moreover, the degree of shrinkage and weight loss during firing is reduced and the crushing strengths are higher.

Table II summarizes the results obtained in a series of tests conducted with different fluoride additives and under different conditions of prepressing, temperature and time prior to pressing and firing.

TABLE II

| No. | Precalcination Step | | | | Additional Additive Prior to Pressing and Firing | Green Density | Fired Density |
| --- | --- | --- | --- | --- | --- | --- | --- |
| | Additive | Pre-pressed | Temp., °C. | Time, hrs. | | | |
| 1[1] | | | | | 10% Na₃AlF₆-0.1% TiO₂ | 1.44 | 1.28 |
| 2 | 3% NaF | No | 1,000 | 1 | | 2.14 | 2.09 |
| 3 | | | | | | 1.49 | 1.54 |
| 4 | | | | | 10% Na₃AlF₆-0.1% CuO | 1.69 | 2.05 |
| 5 | 10% Na₃AlF₆-0.1% Fe₂O₃ | No | 1,000 | 1 | | 2.47 | 2.67 |
| 6 | 10% Na₃AlF₆ | No | 1,000 | 1 | | 2.38 | 2.60 |
| 7 | 10% Na₃AlF₆ | Yes | 1,000 | 3 | | 2.52 | 2.71 |
| 8 | 10% Na₃AlF₆ | Yes | [2]1,000 | 3 | | 2.45 | 2.65 |
| 9 | 3% NaF | No | 1,000 | 1 | 10% Na₃AlF₆-0.1% TiO₂ | 2.18 | 2.26 |
| 10[1] | 10% Na₃AlF₆-0.1% TiO₂ | Yes | [2]1,200 | 3 | | 2.34 | 2.48 |
| 11 | 10% Na₃AlF₆-0.1% TiO₂ | Yes | [2]1,200 | 3 | | 2.34 | 2.51 |

[1] Not Ball Milled.  [2] Reducing Atmosphere.

The condition of the mix does not appear to affect the properties of the refractory brick produced therefrom, thus no apparent difference is observed between bodies produced from material precalcined as a loose powder or as pellets compressed at 10,000 p.s.i. or 21,000 p.s.i. The milling of the alumina used in the refractory mixture increases the density of both the green and the fired bodies. Similarly, precalcination also results in a harder, more dense body. The two effects appear to be additive and higher strengths and densities are realized when both operations, milling and precalcining, are performed.

Calcinations performed at 500° C., 800° C., 1000° C. and 1200° C. indicate that in general the properties of the bodies improved as the precalcination temperature is increased although the degree of improvement decreased between 1000° C. and 1200° C.

The duration of the calcination does not affect the properties of the brick materially when sodium aluminum fluoride (sodium cryolite) is employed. A small increase in fired body density, however, results with increased precalcination time when aluminum fluoride (AlF₃) is used. The following effect of precalcination time demonstrates the relatively minor increase in density obtained by extended precalcination periods even for an AlF₃ mix.

TABLE III

| Precalcination time (AlF₃ mix): | Fired body density (unmilled), g./cm.³ |
| --- | --- |
| 1 min. | 1.92 |
| ½ hr. | 1.99 |
| 1 hr. | 2.04 |
| 3 hrs. | 2.13 |

The amount of fluoride added to the mixture at the calcination stage changes the properties only slightly. The following tabulated data indicate that although the presence of fluoride at precalcination significantly improves the properties, the amount of fluoride added does not materially increase the density although in some instances relatively large amounts of the fluoride can produce significant improvements.

TABLE IV

| Na₃AlF₆ (percent as F): | Fired body density (unmilled), g./cm.³ |
| --- | --- |
| 0 | 1.17 |
| 1 | 1.97 |
| 3 | 1.93 |
| 5.43 | 2.04 |
| 10 | 2.24 |
| AlF₃ (percent as F): | |
| 0 | 1.17 |
| 0.5 | 1.64 |
| 1 | 2.10 |
| 3 | 1.90 |
| 5.43 | 1.99 |

As indicated above, various fluorides can be used according to the invention. Refractory mixtures have been made employing Na₃AlF₆, AlF₃, LiF, NaF, Li₃AlF₆ and CaF₂. The sodium and lithium cryolite and lithium and sodium fluorides produce the most striking improvements in crushing strengths and density, as can be seen from Table V:

TABLE V

| Fluoride employed: | Avg. fired body density (unmilled) |
| --- | --- |
| Na₃AlF₆ | 1.95 |
| AlF₃ | 2.41 |
| LiF | 1.71 |
| NaF | 1.72 |
| Li₃AlF₆ | 2.32 |

Additional increases in density of the fired body can be obtained from addition of more fluoride to the mix prior to pressing and final firing. Thus, the final composition of the refractory brick can be adjusted by addition of fluoride, both at precalcination and prior to firing. This effect is shown by Table VI, which discloses the density increase of the fired body obtainable:

TABLE VI

| Mix | Additional percent Na₃AlF₆ Added | Fired Body Density Increase, g./cm³. |
| --- | --- | --- |
| Uncalcined (7.99% AlF₃) | 10 | 0.54 |
| Calcined (7.99% AlF₃) | 10 | 0.14 |
| Calcined (7.99% AlF₃) (0.1% TiO₂) | 10 | 0.40 |

The pressure used to compress the refractory material into brick form provides little increase in density of the fired bodies. Thus, for example, it has been found that a fourfold increase in pressure from 5850 to 22,000 p.s.i. results in a small increase, i.e., 0.2 g./cc. in density of the fired bodies.

Increase in firing temperature does not appreciably improve the properties of the refractory body. Bodies of alumina containing cryolite or sodium fluoride up to 30% by weight were fired for three hours and 24 hours at 1000°, 1200° and 1400° C. In general, the consistency of the bodies degenerated upon longer firing. The weight loss increased and crushing strength decreased markedly. Shrinkage was greater upon prolonged firing in most cases and longer firing time appears to accomplish nothing more than increase the volatilization of the additives employed which, as indicated previously, is undesirable. The bodies fired at 1400° C. were examined to determine the effect of higher firing temperature and indicated that the crushing strength and apparent density are about the same as for bodies fired at 1200° C. The internal consistency is not noticeably improved over that of bodies fired at the lower temperature and it appears that no particular advantage results in firing bodies at higher temperatures and longer times.

Refractory mixtures containing larger amounts of cryolite have been produced in which the cryolite is present either as large crystals or solid solution crystals of alumina and cryolite. In one series of tests 50% Al₂O₃-50% cryolite mixtures, milled and unmilled specimens, were heated to 1100° C. Upon cooling to room temperature, a dense refractory body was obtained.

In refractory mixtures in which both cryolite and sodium fluoride are added to alumina, a curious result is observed in the effect that the proportion of cryolite and sodium fluoride in the mixture has upon the shrinkage, weight loss, crushing strength and density of the fired refractory body produced from the material. This observation was made after producing refractory bricks containing alumina, cryolite and sodium fluoride in which the cryolite and sodium fluoride component was varied from a weight ratio of 3:1 cryolite to sodium fluoride, and 1:1 cryolite to sodium fluoride. The refractory material was fired at 1200° C. in a reducing atmosphere and at 1400° C. in the same atmosphere. These tests showed that the shrinkage and weight loss were greater at 1400° C. than at 1200° C. and that refractory mixtures with a cryolite ratio of between 2:1 and 4:1 cryolite to sodium fluoride possessed greater crushing strength and higher density. In these mixtures it was also found that the addition of 0.1% $TiO_2$ improved the density of the refractory body.

It is apparent from the above that various changes and modifications may be made without departing from the invention. For example, in addition to the various treatments of the refractory material described above, the use of additives can be employed to either promote sintering or decrease volume shrinkage or perform other desirable functions. Among the additives that have been tested and proven satisfactory for refractory use are metal oxides, such as titanium oxide, cupric and cuprous oxides; aluminates, such as sodium or calcium aluminate, etc. However, where additives are used, they should be used in relatively small amounts, e.g., less than 1%. Furthermore, as pointed out above, the fluorides can be used singly or in combination. They may be added either at precalcination or prior to firing or part at precalcination and part prior to firing. The term "cryolite" as used herein includes those chemical compounds generally having the formula $3XF \cdot AlF_3$ or $X_3AlF_6$ where X designates an alkali metal. Refractory bodies can be produced over a fairly wide range of density and crushing strengths by selecting the processing conditions during production of the refractory bodies. Precalcining is used to obtain improved properties as is milling of the aluminum prior to mixing and blending. Generally, the fluoride or fluorides useful herein may be added to the alumina mix at precalcination to obtain additional improvements in properties. Also, repeated cycles of milling and precalcining can be employed to obtain further property improvement.

Accordingly, the invention should be limited only by the appended claims, wherein what is claimed is:

1. A method of making a refractory body of improved quality comprising preparing a refractory mixture consisting essentially of a major portion of alumina and a minor portion of at least one fluoride from the group consisting of alkali metal fluorides, alkaline earth metal fluorides, and aluminum fluoride, milling the mixture, precalcining the refractory mixture at a temperature of at least about 500° C., pressing the refractory mixture into desired form, and firing the pressed form at a temperature of at least about 850° C. and below the volatilization temperature of said fluoride constituent.

2. A refractory body made according to claim 1.

3. A method of producing a refractory body of improved quality comprising milling a refractory mixture consisting essentially of a major portion of alumina and a minor portion of at least one fluoride from the group consisting of alkali metal fluorides, alkaline earth metal fluorides and aluminum fluoride, precalcining the refractory mixture at a temperature of at least about 500° C., milling the precalcined refractory mixture, pressing the refractory mixture into desired form, and firing the pressed form at an elevated temperature of at least about 850° C. but below the volatilization temperature of said fluoride constituent.

4. A method of producing a refractory body of improved quality comprising preparing a refractory mixture consisting essentially of a major portion of alumina and a minor portion of sodium fluoride and cryolite wherein the cryolite to sodium fluoride ratio by weight is between 2:1 and 4:1, milling said refractory mixture, precalcining the milled refractory mixture at a temperature of at least about 500° C., pressing the refractory mixture into desired form, and firing the pressed form at an elevated temperature of at least about 850° C. and below the volatilization temperature of said sodium fluoride and cryolite.

References Cited by the Examiner

UNITED STATES PATENTS 3,093,570   6/1963   Dewey _____ 106—65

TOBIAS E. LEVOW, *Primary Examiner.*

J. POER, *Assistant Examiner.*